J. FOX.
Corn Shield.
No. 86,521.
Patented Feb. 2, 1869.
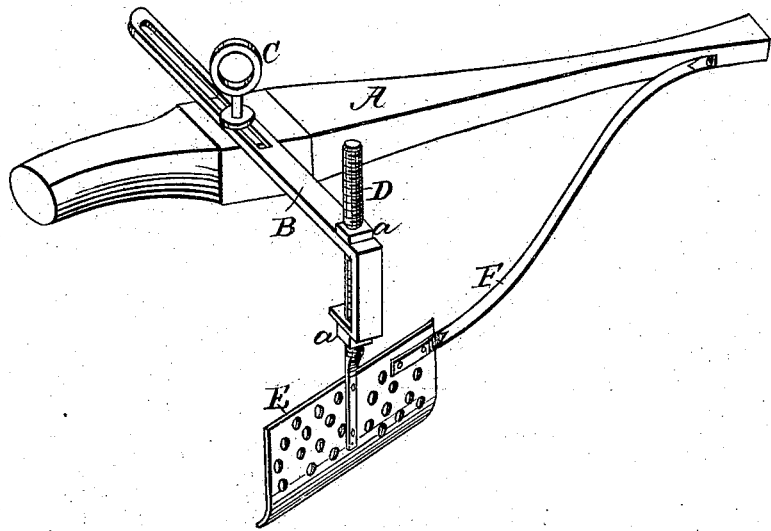

UNITED STATES PATENT OFFICE.

JOHN FOX, OF HOMER, INDIANA.

IMPROVEMENT IN SHIELDS FOR CORN IN PLOWING.

Specification forming part of Letters Patent No. 86,521, dated February 2, 1869.

*To all whom it may concern:*

Be it known that I, JOHN FOX, of Homer, in the county of Rush, and in the State of Indiana, have invented certain new and useful Improvements in Shields for Corn; and I do hereby declare that the following is a full, clear, and exact description thereof, reference being had to the accompanying drawings, and to the letters of reference marked thereon.

In the annexed drawings, making part of this specification, A represents the beam of a plow. Lying crosswise of this beam, and secured to it by means of a thumb-screw, C, is a slotted metallic bar, B. One end of this bar is turned down at right angles, and, after extending downward several inches, is again turned at right angles inward, as represented.

D represents a screw-shaft, which passes through suitable openings in that end of the bar which is bent, as seen, having two nuts, a a, which station it in the desired position. On the lower end of this shaft D is secured a metallic plate, E, which may or may not be perforated. The forward end of the plate E is connected to the forward end of the beam by means of a rod, F. The screw-shaft D is placed in a vertical position. The object of this device is to prevent, in plowing young corn, the clods of earth or too much earth falling upon or against the corn. The plate E runs next to the corn and between it and the mold-board of the plow, and defends it from the earth, which would break and bend it down. This plate may be adjusted to or from the corn by means of the set-screw and slotted bar B, which said bar has an endwise movement across the beam, and the height of the plate E may be regulated by means of the screw-shaft D, with its nuts a a.

Having thus fully described my invention, what I claim as new, and desire to secure by Letters Patent, is—

The bar B, set screw C, screw-shaft D, plate E, nuts a a, and rod F, used with the beam A, substantially as and for the purpose set forth.

In testimony that I claim the foregoing I have hereunto set my hand this 5th day of July, 1867.

JOHN FOX.

Witnesses:
JAMES W. FERGASON,
SAMUEL S. POUNDSTON.